United States Patent Office
3,509,784
Patented May 5, 1970

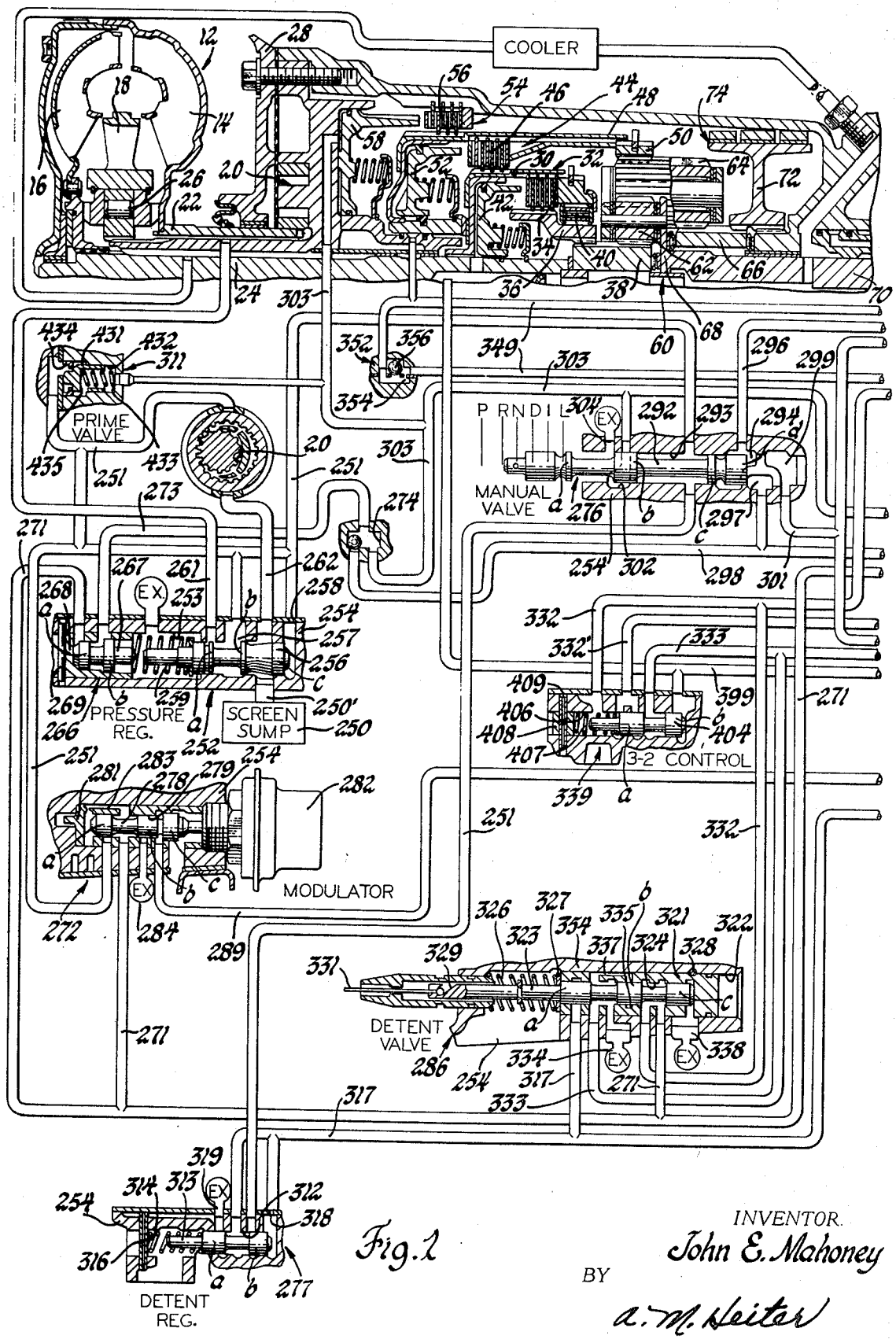

3,509,784
TRANSMISSION CONTROL
John E. Mahoney, Bloomfield Hills, Mich., assignor to General Motors Corporation, Detroit, Mich., a corporation of Delaware
Filed Sept. 10, 1968, Ser. No. 758,915
Int. Cl. B60k 17/10; F16h 5/74, 57/10
U.S. Cl. 74—869
4 Claims

ABSTRACT OF THE DISCLOSURE

A transmission and control are shown in which the control directs fluid through the shift valve and a shift control valve to engage and disengage friction torque establishing devices. The shift control valve directs fluid to enforce engagement of two devices during a low speed ratio and one of these devices during a high and reverse speed ratio. Also, the shift control valve directs fluid to enforce disengagement of the other device during the high speed ratio.

---

Figure 2A:
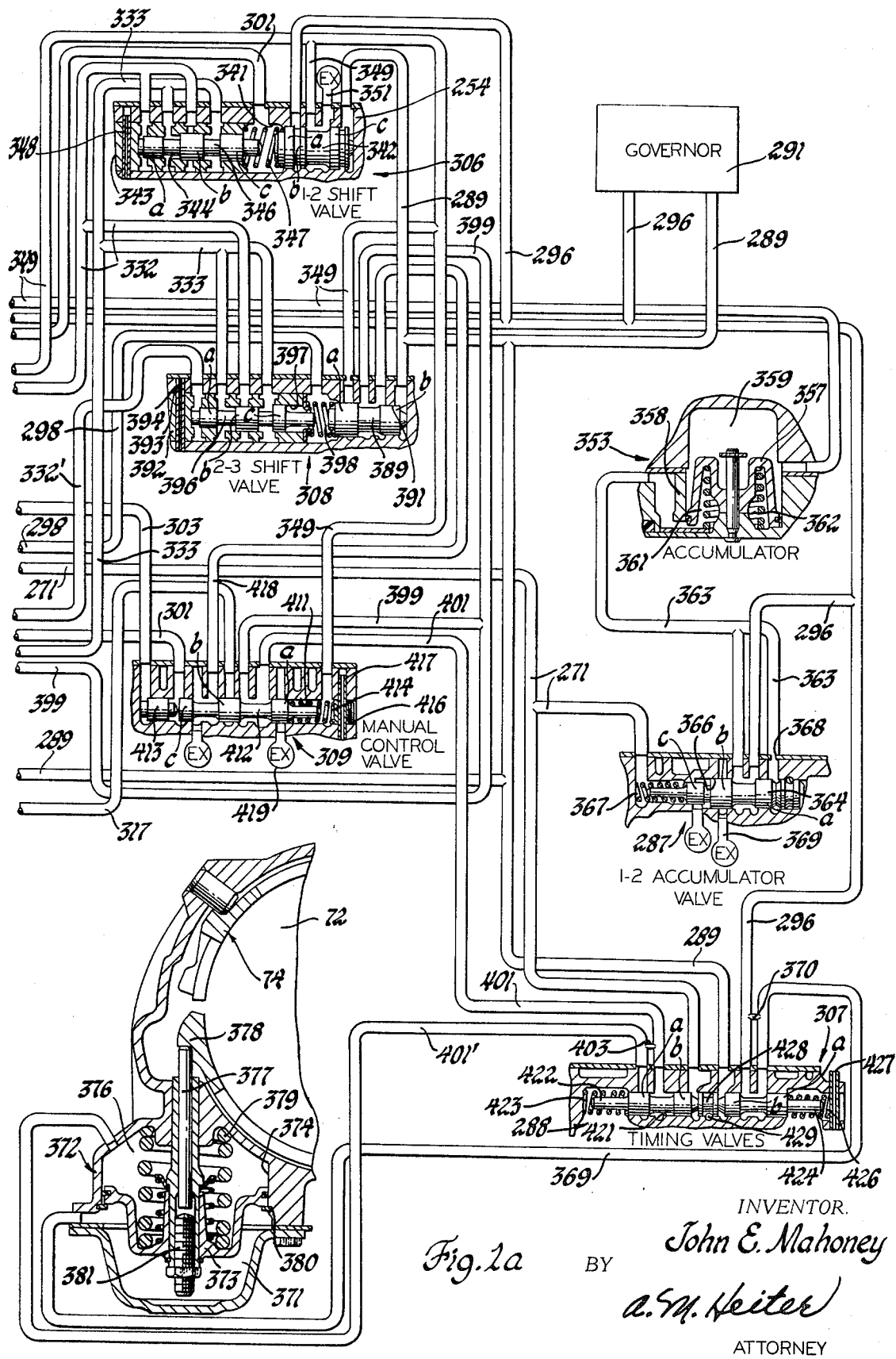

This invention relates to automatic transmissions and controls and more particularly to controls which permit automatic ratio change and provide enforcement of friction devices during manual selection of a drive ratio.

The control system is adapted for use with a multi-ratio planetary gear transmission particularly of the type disclosed in U.S. patent application Ser. No. 759,671 filed Sept. 13, 1968. During operation in automatic drive, high ratio manual low and reverse, the same clutch is engaged to provide an input for the planetary gear set. Also, during high ratio, a brake, which is engaged during first and second ratios, must be released. A low-reverse shift control valve is associated with a 2-3 upshift valve to provide the proper distribution of fluid to obtain the desired engagement and disengagement of the clutch and brake.

It is an object of this invention to provide in an improved transmission control a shift control valve and a shift valve which direct fluid from a manual valve to enforce engagement of one friction device during low, high and reverse speed ratios, and to enforce disengagement of another friction device during the high speed ratio.

This and other objects and advantages will become apparent from the following specification and drawings in which:

FIGS. 1 and 1A when combined show a transmission and a hydraulic control system.

Referring to the drawings, there is shown in FIGS. 1 and 1A a transmission and controls therefore. The transmission includes a torque convertor 12 having an impeller 14, a turbine 16 and a stator 18. The impeller 14 is adapted to be connected to an engine and is drive connected to a hydraulic pump 20 by a sleeve shaft 22. The turbine 16 is splined to an input shaft 24, and the stator 18 is grounded through a one-way brake 26 to the transmission housing 28. The torque convertor 12 is of conventional design and operates in the conventional manner.

The input shaft 24 is splined to drum 30 of a fluid operated low clutch 32. The low clutch 32 has a plate pack 34 which has alternately spaced plates splined to the drum 30 and an inner drum 36 which is splined to an input sun gear 38. The sun gear 38 is also drive connected to the drum 30 through a one-way clutch 40. The low clutch 32 is engaged by a piston 42 which is hydraulically actuated. Thus, when the clutch 32 is engaged, or the input shaft 24 is rotated faster than the sun gear 38, the sun gear 38 is driven as an input member.

The drum 30 is also a component of an intermediate clutch 44 which has a plate pack 46 of alternately spaced plates splined to the drum 30 and an outer drum 48 which is splined to a ring gear 50. When the intermediate clutch 44 is engaged by a hydraulically operated piston 52, the ring gear 50 is driven, as an input member, by the input shaft 24. The outer drum 48 is also a component of a fluid operated reverse brake 54 which includes a plate pack 56, having alternately spaced plates splined to the outer drum 48 and a splined portion of the housing 28, and a hydraulically actuated piston 58 which engages the reverse brake 54.

The sun gear 38 and the ring gear 50 are components of a planetary gear set 60 which includes intermeshing short and long planet pinions 62 and 64 meshing with the sun gear 38 and ring gear 50 respectively, a reaction sun gear 66 meshing with the long pinions 64 and an output carrier 68 rotatably supporting the pinions 62 and 64. The carrier is secured to an output shaft 70 to provide an output for the transmission. The reaction sun gear 66 is splined to a drum 72 which is encircled by a fluid operated double wrap brake band 74. When the brake band 74 is engaged, the sun gear 66 is held stationary to provide a reaction member for the transmission.

The above-described transmission arrangement is the subject of U.S. patent application, Ser. No. 759,671 filed Sept. 13, 1968 and reference may be had thereto for the purpose of supplementing this disclosure.

The transmission is capable of either automatic shifting through three speed ratios or manual ratio change in forward drive. During automatic operation in first gear, the brake band 74 is applied thus preventing rotation of reaction sun gear 66. With the brake 74 applied, the power flow is from the engine through the impeller 14, to the turbine 16, through the input shaft 24, and the drum 30 to the one-way clutch 40. Since the input shaft is attempting to rotate faster than the one-way clutch 40, the input sun gear 38 is driven by the input shaft 24. Since the reaction sun gear 66 is stationary, the planet pinions 62 and 64 are urged to "walk-around" or planetate about the reaction sun gear 66 thereby causing the carrier 68 to rotate in the same direction as the input shaft 24, but at a reduced speed and an increased torque. Since the output shaft 70 is secured to the carrier 68, it also rotates in the same direction as the input shaft 24, but at a reduced speed and an increased torque. Also, during first gear operation, the stator 18 is stationary to provide additional torque multiplication between the engine and the output shaft 70.

To change from first gear to second gear, intermediate clutch 44 is engaged, thus connecting the ring gear 50 to the input shaft 24. The brake 74 remains engaged to maintain the sun gear 66 as a reaction member. As the ring gear 50 is driven by the input shaft 24, the planet pinions 62 and 64 are driven by the ring gear 50 so that they "walk around" the reaction sun gear 66 driving the carrier 68 with them. During second gear operation, the carrier rotates at a reduced speed, but more rapidly than it did in first gear. Also, during second gear operation, the sun gear 38 is driven forwardly by the rotation of planet pinions 62 and 64 and rotates more rapidly than the input shaft 24. Thus, the one-way clutch 40 is ineffective or in an overrunning condition. During second gear operation, the stator 18 may be either stationary to provide additional torque multiplication or the stator may be "freewheeling" with the torque convertor 12 in "coupling phase."

To change from second to third gear, the brake 74 is disengaged and the clutch 32 is engaged while the clutch 44 remains engaged, thus input shaft 24 drives the ring gear 50 and sun gear 38. The planetary gear set 60 is then in a locked up condition and rotates in the same direction as the input shaft 24 and at the same speed to drive the output shaft 70 in the same direction at the same speed.

In low gear manual operation, the brake 74 is engaged and the low clutch 32 is engaged. Thus the power path is the same as an automatic first gear except that the power flow is through the clutch 32 to the sun gear 38. Thus a two-way connection is provided between the engine and the sun gear 38 so that engine braking is available in manual first gear. The transmission may be manually shifted from first to second gear disengaging clutch 32 while engaging clutch 44.

For reverse gear operation, the reverse brake 54 is engaged thus establishing the ring gear 50 as the reaction member of the planetary gear set 60, and the clutch 32 is engaged, establishing the sun gear 38 as the input member. The planet pinions 62 and 64, driven by the sun gear 38, "walkaround" the inside or ring gear 50 in a direction opposite to the rotation of input sun gear 38, thereby driving the carrier 68 and output shaft 70 in a direction opposite to the input shaft 24.

Each of the above described clutches and brakes has a set of plates or a band providing a friction torque device. Each friction torque device and its operating motor provides a friction torque establishing device.

The intermediate and low clutches 44 and 42 and the reverse and low brakes 54 and 74 are actuated by fluid pressure supplied by the hydraulic control system shown in FIGS. 1 and 1A. The internal-external gear pump 20 receives fluid from the sump with a screen 250 via suction line 250' or regulator valve exhaust port and inlet passage 262 and delivers fluid to the control system through main pressure passage 251. The pressure level of the fluid in passage 251 is established by the main pressure regulator valve 252.

The main pressure regulator valve 252 includes a valve bore 253, a valve body 254, and a valve spool 256 slidably mounted in the valve bore 253. The valve spool 256 has three equal diameter lands $a$, $b$ and $c$ which control the flow of fluid through the pressure regulator valve 252. The fluid in passage 251 is directed to ports 257 between lands $a$ and $b$ and through restriction 258 to the right end of valve land $c$. A spring 259 operates on the left end of land $a$ to urge the valve to its rightward position until sufficient pressure in passage 251 is developed on the right end of land $c$ to move the spool 256 leftward against the force of spring 259. Leftward movement of the spool 256 initially opens the area between lands $a$ and $b$ to the torque convertor feed passage 261. Further leftward movement of the valve spool 256 opens the area between lands $b$ and $c$ to the pump inlet passage 262 thereby discharging excess fluid flow from the pump 20 and regulating main line pressure in passage 251. During operation of the transmission, as engine torque requirements increase and/or during reverse or intermediate drive ratios, it is necessary to increase the main regulator pressure above the level established by the spring 259. To provide this pressure increase, a modulator and intermediate-reverse boost valve 266 is used. The boost valve 266 includes a boost valve spool 267 having a small diameter land $a$ and a large diameter land $b$ slidably mounted in a sleeve 268 which is held in position in the valve bore 253 by a pin 269 and the spring 259. To increase the main line regulator pressure with increasing engine torque, a modulator passage 271 directs fluid from the modulator valve 272 to the left end of boost valve spool 267 to move it to the right against the valve spool 256 thereby adding to the bias force created by spring 259. To provide a pressure increase during intermediate or reverse operation, an intermediate-reverse boost passage 273 directs fluid from a boost control valve 274 to the boost valve spool 267 where it operates on the differential area between lands $a$ and $b$ to move the boost valve spool 267 to the right against valve spool 256 thereby increasing the bias force. The main line pressure fluid in main passage 251 is also directed to the modulator valve 272, a manual shift valve 276 and through the manual shift valve 276 to a detent regulator valve 277.

The modulator valve 272 includes a valve spool 278 having two equal diameter lands $a$ and $b$ and a larger diameter land $c$ slidably mounted in a bore 279 of a sleeve spool 281 which is held in the valve body 254 by a vacuum motor 282. When the valve spool 278 is moved to the left by the vacuum motor 282, the pressure fluid in main passage 251 is directed between lands $a$ and $b$ to the modulator passage 271 which is connected through a restriction passage 283 to the left end of valve spool 278 to move it to the right against the force of the vacuum motor 282 until the passage 251 is closed by land $a$ and if the pressure in passage 271 is greater than the force in the vacuum motor 282, the valve spool 278 continues to move to the right until an exhaust passage 284 is opened by land $b$. The vacuum motor 282 is of conventional design such that when engine vacuum is high, the force exerted on the spool 278 is low and the modulator pressure is low and when engine vacuum is low, the vacuum motor force is high as is modulator pressure passage 271. Besides directing modulator pressure through the boost valve 266, the modulator passage 271 also directs modulator pressure to the detent valve 286, a 1–2 accumulator valve 287 and a low-speed timing valve 288. To decrease the fluid pressure in modulator passage 271, governor pressure in governor passage 289, which delivers fluid pressure proportional to vehicle speed from a governor 291, operates on the differential area between lands $b$ and $c$ thereby decreasing the bias force of the vacuum motor 282 which causes a decrease in modulator pressure.

The manual valve 276 is a manually operated valve including a valve spool 292 having four equal diameter lands $a$, $b$, $c$ and $d$ slidably mounted in a valve bore 293 in the valve body 254. The valve spool 292 is connected to a shift selector lever. The valve spool 292 is movable to five positions including park P, reverse R, neutral N, drive D, intermediate I and low L. When the valve spool 276 is moved to drive D, main line pressure in main passage 251 is directed between lands $b$ and $c$ to a drive port 294 which is connected to a drive passage 296. When the valve spool 292 is moved to intermediate I, main line pressure in passage 251 is directed between lands $b$ and $c$ to the drive port 294 and between lands $c$ and $d$ to an intermediate port 297 which is connected to an intermediate passage 298. When the valve spool 292 is moved to the low L position, main line pressure in main passage 251 is directed between lands $b$ and $c$ to the drive port 294 and the intermediate port 297 and between lands $c$ and $d$ to a low port 299 which is connected to a low passage 301. When the valve spool 292 is moved to the reverse R position, the fluid in main passage 251 is directed between lands $b$ and $c$ to a reverse port 302 which is connected to a reverse signal passage 303. When the valve spool 292 is in the neutral N position, as shown, the reverse port 302 is exhausted at the left end of the spool while the drive port 294, intermediate port 297 and low port 299 are connected to exhaust at the right end of the valve bore 293. When the valve spool 292 is moved to the park P position, the valley between lands $c$ and $d$ is aligned with main passage 251 while the reverse port 302 is connected to exhaust port 304 between lands $b$ and $c$ and the drive, intermediate and low ports 294, 297 and 299 are exhausted at the right end of valve bore 293. The drive passage 296 is connected to a 1–2 shift valve 306, the governor 291, the 1–2 accumulator valve 287 and a high speed timing valve 307. The intermediate signal passage 298 is connected to the boost control valve 274 and to a 2–3 shift valve 308. The low passage 301 is connected to the 1–2 shift valve 306 and to a low-reverse control valve 309. The reverse passage 303 is connected to the boost control valve 274, the low-reverse control valve 309, the reverse brake 54 and a priming valve 311. Thus, whenever the manual valve 276 is moved to the reverse position, the reverse brake 54 is engaged.

The passage 251 is also connected, as mentioned above, to the detent regulator valve 277 which includes the valve bore 312, the valve spool 313 having equal diameter lands *a* and *b* slidably disposed in the valve bore 312 and a bias spring 314 compressed between the valve land *a* and a pin 316 secured in the valve body 254. The spring 314 moves the valve spool 313 to the right so that main passage 251 is open between lands *a* and *b* to a detent regulator passage 317. The detent regulator passage 317 is connected through a restriction 318 to the right end of the valve spool 313 to move it leftward against the force of spring 314 until the main passage 251 is closed by land *b*. If the fluid pressure, in detent passage 317, acting on the end of valve spool 313 is greater than the force imposed on the valve spool 313 by the spring 314, the valve spool 313 will continue to move leftward until the detent passage 317 is open to an exhaust passage 319 between lands *a* and *b* thereby relieving excess pressure in detent passage 317. Thus the detent regulator valve 277 establishes a constant detent pressure which is less than main line pressure in main passage 251. The detent passage 317 is also connected to the detent valve 286 and low-reverse control valve 309.

The detent valve 286 includes a sleeve valve 321 located in a bore 322 of the valve body 254, a valve spool 323 having equal diameter lands *a*, *b* and *c* slidably mounted in a bore 324 of the sleeve valve 321 and a compression spring 326 compressed between the valve body 254 and a spring set 327 which abuts the left end of land *a*. A pin member 328 is placed between the valve body 254 and the sleeve valve 321 to locate the sleeve valve 321 in the bore 322. The valve spool 323 has a notch 329 adjacent its left end into which is inserted one end of a pull cable 331 connected to an operator throttle pedal so that when the throttle pedal is fully depressed, the cable 331 will move the valve spool 323 to the left against the force of the spring 326 to establish a detent position. With the detent valve in the spring set position, as shown, the modulator passage 271 is open between lands *b* and *c* to a modulator-detent passage 332 while the detent passage 317 is closed by land *a*. Also, in the spring set position, a detent-exhaust passage 333 is connected between lands *a* and *b* to an exhaust port 334 and a secondary port 335 which is connected to the detent-exhaust passage 333 via a peripheral passage 337 which is also connected to exhaust. When the detent valve 286 is moved, by the operator, to detent position, the modulator passage 271 is closed by valve land *c* and the exhaust port 334 is closed by valve land *b* while the detent passage 317 is open between lands *a* and *b* to the detent-exhaust passage 333, and via peripheral passage 337 and secondary port 335 is also opened between lands *b* and *c* to the modulator-detent pasage 332. An exhaust port 338 connects the right end of valve spool 323 and bore 324 to exhaust to prevent pressure buildup in this area due to fluid leakage past valve land *c* which could cause an undesirable movement of the detent valve 286 to the detent position. Thus, it is seen that during normal operation, the modulator detent passage 332 is filled with modulator pressure fluid and the detent exhaust passage 333 is vented and during detent operation, both passages 332 and 333 are filled with fluid at the detent regulator pressure. Also both of the passages 332 and 333 are connected to the 1–2 shift valve 306, the 2–3 shift valve 308 and a 3–2 downshift control valve 339. These passages provide downshift signals to the 1–2 and 2–3 shift valve.

The 1–2 shift valve 306 includes a bore 341 in valve body 254, an upshift valve spool 342 having two equal diameter lands *a* and *b* and a smaller land *c* slidably mounted in the bore 341, a downshift sleeve valve 343 having a stepped bore 344, a downshift valve spool 346 having small, intermediate and large diameter lands *a*, *b* and *c* respectively, slidably mounted in bore 344, and a downshift bias spring 347 compressed between the right end of sleeve valve 343 and the land *a* of upshift valve spool 342. The downshift sleeve valve 343 is located in the valve bore 341 by a pin 348. The 1–2 shift valve functions to control automatic shifting between first and second ratio in the transmission or to maintain manual low ratio in the transmission. During normal automatic operation, modulator pressure in the modulator-detent passage 332 is connected to the left end of land *a* of downshift valve spool 346 to move it to its rightward position where it abuts upshift valve spool 342 to provide a torque demand bias on the upshift valve spool 342. Also, with the downshift valve spool 346 in its rightward or downshifted position, the modulator pressure in modulator-detent passage 332 is connected between lands *a* and *b* to operate on the differential area therebetween to provide an additional downshift bias. The detent-exhaust passage 333 is also connected at two locations to the downshift valve spool 346. With the downshift valve spool 346 in the downshift position, one of these connections is blocked by valve land *a* of the downshift spool 346 and the other connection is open to the differential area between *b* and *c* of the downshift spool 346. During normal operation, however, the detent-exhaust passage 333 is exhausted so that no downshift bias is present. The upshift valve spool 342 is operated on by governor pressure in governor passage 289 at the right end of land *c* of the upshift spool 342. As vehicle speed and, therefore, governor pressure increase, the upshift valve spool 342 and the downshift spool 346 will move leftward to the upshifted position when the governor pressure is sufficient to overcome the downshift spring 347 and the downshift bias provided by modulator pressure. When the upshift valve spool 342 is in the downshifted position, as shown, main pressure in drive passage 296 is blocked by valve land *a* of the upshift spool 342. When the upshift spool 342 is in the upshifted position, main pressure in drive passage 296 is connected between lands *b* and *c* to an intermediate clutch passage 349. When the upshift valve spool 342 is moved to the upshifted position, main line pressure operates on the differential area between lands *b* and *c* of the upshift valve 342 to assist governor pressure and to provide an upshifted bias or hysteresis. When the downshift spool 346 is in the upshifted position, as shown, the modulator pressure connection between lands *a* and *b* of the downshift spool 346 is blocked by valve land *b* thus decreasing the modulator downshift bias to provide a downshift bias to provide a downshift hysteresis. The upshift and downshift hysteresis prevent a "hunting" condition in the 1–2 shift valve by requiring an increase in modulator pressure to cause the 1–2 shift valve to downshift even if the governor pressure is held constant. When the 1–2 shift valve 306 is in the downshifted position, the intermediate clutch passage 349 is connected between lands *b* and *c* of upshift valve spool 342 to an exhaust passage 351. The intermediate clutch passage 349 is connected to the 2–3 shift valve 308, the low-reverse control valve 309, and through a clutch timing valve 352 to the intermediate clutch 44 and an accumulator 353. Thus, when the 1–2 shift valve 306 is upshifted, main line pressure is directed to intermediate clutch 44 so that it will engage.

The rate of engagement of the intermediate clutch 44 is controlled by the clutch timing valve 352 and the accumulator 353. The clutch timing valve 352 includes the restriction 354 and a ball-check valve 356. During engagement of the intermediate clutch 44, the fluid in intermediate clutch passage 349 maintains the ball-check valve 356 closed so that the fluid must flow at a control rate through restriction 354. When the intermediate clutch passage is exhausted, the ball-check 356 opens to permit rapid disengagement of the intermediate clutch 44. The accumulator 353 includes the piston 357 slidably mounted in a cylinder 358 so as to form an intermediate clutch control chamber 359 and an accumulator charge pressure chamber 361. The compression spring 362 is compressed in the charge chamber 361 between the piston 357 and one end of cylinder 358 which tends to move the piston 357 upward thereby reducing the volume in control chamber 359 while increasing the volume in charge chamber 361. The charge chamber 361 is connected via an accumulator charge-passage 363 to the 1–2 accumulator valve 287.

The 1–2 accumulator valve 287 includes a valve spool 364 having equal diameter lands $a$ and $b$ and a smaller diameter land $c$ slidably mounted in a stepped bore 366 and a spring 367 compressed between one end of bore 366 in the land $c$. With the valve spool 364 in the spring set position, as shown, the drive passage 296 is connected between lands $a$ and $b$ to the accumulator charge passage 363 which permits main pressure in drive passage 296 to enter the accumulator charge passage 363. However, the accumulator charge passage 363 is also connected through restriction 368 to the right end of land $a$. As the pressure increases in charge passage 363, it fills chamber 361 and also acts on land $a$ to move the valve spool 364 leftward against the force of spring 367. As the spool 364 moves leftward, the drive passage 296 is closed by land $a$ and the accumulator charge passage 363 is open to an exhaust passage 369 between lands $a$ and $b$. Thus a regulated pressure less than main line pressure is established by the 1–2 accumulator valve. The accumulator controls the rate of pressure rise in the intermediate clutch 44 due to the fact that the accumulator chamber 359 must be filled before full main pressure is available to fully engage the intermediate clutch 44. The accumulator charge pressure varies with variations of engine torque demand. To accomplish this, the modulator pressure in modulator passage 271, which is a function of engine torque demand, is connected to the left end of valve land $c$ to assist the spring 367 thereby increasing accumulator charge pressure in passage 363 as engine torque demand increases.

When the manual valve 276 is moved to the low L position, main pressure in low passage 301, as described above, is directed to the 1–2 shift valve 306 between the upshift spool 342 and the downshift spool 346. With main pressure acting on the upshift spool 342 to maintain it in its downshifted position, the 1–2 shift valve 306 cannot be upshifted by governor pressure since governor pressure never exceeds main pressure.

Also during low and intermediate operation, as described above, the brake 74 must be engaged. To accomplish the engagement of brake 74, main pressure in passage 296 is directed to servo apply passage 369 either via restriction 370 or the high speed timing valve 307, the operation of which will be described later.

The servo apply passage 369 is connected to an apply chamber 371 of a servo 372. The servo 372 is an expansible hydraulic motor including a piston 373, slidably mounted in a cylinder 374 so as to form the servo apply chamber 371 and a servo release chamber 376. The piston 373 has a piston rod 377 which abuts a lug 378 on the outer periphery of the double-wrap brake band 74. A return spring 379 maintains the piston 373 "bottomed" in the cylinder 374 against a snap ring 380. An adjusting screw 381 permits the brake band 74 to be adjusted so that it is fully applied after a predetermined movement of the piston 373. Also, if the brake band 74 should wear after it has been in operation, it may be readjusted with the adjusting screw 381. With the piston "bottomed" in the cylinder, the double-wrap band 74 does not apply any braking force to the drum 72. Thus, the brake band 74 is disengaged and the servo 372 is in its released position. However, when the manual valve 276 is shifted to drive, intermediate or low positions, main line pressure is developed in drive passage 296 which, as described above is connected to servo apply passage 369 so that main line pressure will develop in the servo apply chamber 371. As main line pressure develops in the apply chamber 371, the piston 373 moves upward in the cylinder 374 causing the brake band 74 to tighten on the brake drum 72 thus engaging the low brake. The low brake remains engaged for both low and intermediate gear ratios. Thus, the movement of the 1–2 shift valve 306 from its downshift to upshift positions and vice-versa does not affect the operation of the servo 372.

The 2–3 shift valve 308 controls upshifting and downshifting between intermediate and third gear ratios in the transmission. It is similar in construction to the 1–2 shift valve having an upshift spool 389 with a large diameter land $a$ and a small diameter land $b$ slidably mounted in a stepped-bore 391, a sleeve valve 392 located in a bore 393 by a pin 394 and a downshift valve spool 396 having lands $a$, $b$ and $c$ of small intermediate and large diameters respectively, slidably mounted in a stepped bore 397 in the sleeve valve 392. A downshift bias spring 398 urges the upshift spool 389 to its downshifted position, as shown. Governor pressure in passage 289 operates on the right end of land $b$ of the upshift spool 389 to provide an upshift bias proportional to vehicle speed. A modulator-detent passage 332' is connected between the left end of land $a$ of downshift spool 396 and the 3–2 downshift control valve 339 to provide a downshift bias. During normal driving operations, when the downshift spool 396 is moved to the right to its downshifted position, a downshift bias is also present at the differential area between lands $a$ and $b$ from the modulator-detent passage 332. However, when the downshift spool 396 is in the upshifted position shown, the pressure in the modulator-detent passage 332 is disconnected from the downshift spool 396 by land $b$ thus providing a downshift hysteresis. When the detent valve 286 is moved to detent position, an additional bias pressure is present from detent-exhaust passage 333 which is connected to the differential area between lands $b$ and $c$ of the downshift spool 396 in both the upshifted and downshifted positions. When the downshift spool 396 is in the upshifted position shown, detent pressure in the detent-exhaust passage 333 is admitted to the differential area between lands $a$ and $b$ to provide an additional downshift bias. Thus, during normal operation, modulator pressure is available at two areas to resist an upshift until governor pressure is sufficient to overcome the bias pressures and the downshift bias spring 398. During detent operation, a downshift bias is present at three areas of the downshift spool 396 to either resist upshift or to enforce downshift. When the upshift spool 389 is moved to its upshifted position, main pressure in intermediate clutch passage 349 is directed between lands $a$ and $b$ to a low clutch passage 399. Due to the differential area between lands $a$ and $b$, an additional upshift force or hysteresis is imposed in the upshift spool 389 when it is in the upshifted position. The low clutch passage 399 is connected to the low-reverse control valve 309, the 3–2 downshift control valve 339 and to the low clutch 32. Thus, as the 2–3 shift valve moves to its upshifted position, main line pressure is admitted to the low clutch 32 to enforce its engagement. The intermediate passage 298 is connected to the 2–3 shift valve 308 between the upshift and downshift spools 389 and 396 to force the upshift spool 389 to its downshifted position and prevent a 2–3 upshift from occurring.

Also during a 2–3 shift, the brake band 74 must be released. This is accomplished by directing main line pressure fluid in the low clutch passage 399 through the low-reverse control valve 309 to a servo release passage 401 which is connected via an orifice 403 or through the low speed timing valve 288 to a servo release passage 401' which is connected to the servo release chamber 376. Thus, main line pressure is present in both the servo apply and servo release chambers 371 and 376 so that the piston 373 is in hydraulic balance and the spring 379 causes a servo 372 to release.

The 3–2 downshift control valve 339 includes a valve spool 404 having equal diameter lands $a$ and $b$ slidably mounted in a valve bore 406 and a compression spring 407 compressed between valve land $a$ and a plug 408 which is secured in the valve bore 406 by pin 409. During normal operation with the valve position in the spring set position, as shown, modulator pressure in a modulator-detent passage 332, is directed to the left end of valve land *a* to assist the spring 407 and past valve land *a* to the modulator-detent passage 332′. The detent-exhaust passage 333, which is exhausted during normal operation, is connected between lands *a* and *b* and the low clutch passage 399 is connected to the right end of land *b* to urge the valve spool 404 to move to the left when the low clutch 32 is applied. If the modulator pressure in passage 332 is sufficiently low, main line pressure in low clutch passage 399 will move the valve spool 404 to the left thereby connecting modulator-detent passage 332′ to exhaust via detent-exhaust passage 333 between lands *a* and *b* thus exhausting the downshift bias pressure which is present at land *a* of the downshift valve 396. To obtain part throttle downshift, the modulator pressure in passage 332 must be increased sufficiently to assist the spring 407 in overcoming main pressure on land *b* of valve spool 404 thus reconnecting modulator-detent passage 332′ to modulator-detent passage 332. During detent operation, detent pressure is present in modulator-detent passage 332 to cause the 3–2 downshift control valve 339 to move to the position shown thus providing three downshift bias pressures, as described above.

The low-reverse control valve 309 includes a single diameter bore 411 having a valve spool 412 with equal diameter lands *a*, *b* and *c* and a plug valve 413 slidably mounted in the bore 411. The plug valve 413 is located between one end of valve bore 411 and the land *c* and a compression spring 414 is located between the land *a* and a stop 416 which is held in the other end of the bore 411 by a pin 417. Thus the spring urges the spool 412 and the plug valve 413 leftward in the bore 411. The reverse signal passage 303 is connected to the low-reverse control valve 309 betwen the plug valve 413 and the one end of bore 411. The intermediate clutch passage 349 is connected to the low-reverse control valve 309 at the right end of valve spool 412 and, therefore, assists the spring 414 in holding the valve spool 412 in the position shown after the 1–2 shift valve 306 has been upshifted. When the manual valve 276 is moved to reverse, main pressure in passage 303 will shift the plug valve 413 and the spool 412 rightward against the spring 414. The low signal passage 301 is connected to the low-reverse control valve 309 between the plug valve 413 and the spool valve 412. When the manual valve 276 is moved to the low position, main presssure from low signal passage 301 causes the valve spool 412 to move to the right against spring 414 while the plug valve 413 remains in the position shown. In the position shown, the low clutch passage 399 is connected between lands *a* and *b* to the servo release passage 401 to direct main line pressure from the 2–3 shift valve to the servo 372 when the 2–3 shift valve 308 is upshifted. The detent passage 317 is blocked by land *b* when the low-reverse control valve 309 is in the spring set position. However, when main line pressure is available in either the low signal passage 301 or the reverse signal passage 303 to shift the valve spool 412, the detent pressure in detent passage 317 is open between lands *b* and *c* to a detent clutch apply passage 418 which directs fluid at detent pressure to the upshift valve spool 389 between lands *a* and *b*. The detent clutch apply passage 418 is connected between lands *a* and *b* of the upshift spool 389 to the low clutch apply passage 399 thus during manual low of a reverse operation, the low clutch 32 is engaged by detent pressure. Also, when the low-reverse control valve 309 is shifted, the servo release passage 401 is connected between lands *a* and *b* to an exhaust port 419. Thus during manual low operation, the servo 372 will be applied by the main pressure in servo apply passage 369 and the servo release chamber 376 will be exhausted via passages 401′ and 401.

Under certain driving conditions, especially during coasting or during force downshift at high vehicle speeds, it is desirable to delay the engagement of the brake band 74 during a 3–2 downshift. The low speed and high speed, timing valves 288 and 307 provide such a delay. The low speed timing valve 288 includes a bore 421, a valve spool 422 having equal diameter lands *a* and *b* slidably mounted in bore 421 and a compression spring 423 between one end of bore 421 and the valve land *a*. The high speed timing valve 307 has a valve spool 424 with equal diameter lands *a* and *b* also slidably mounted in valve bore 421 and a compression spring 426 held between land *a* of spool 424 and a pin 427 which is located in the valve bore 421. A plug 428 is positioned in valve bore 421, by a pin 429, between spools 422 and 424 to separate them.

The modulator passage 271 is connected to the right end of valve spool 422 between land *b* and plug 428 to provide a modulator pressure signal which will move the valve spool 422 to the left aaginst the spring 423 when the modulator pressure is sufficiently high. The servo release passage 401 is connected between lands *a* and *b* of the valve spool 422 while the servo release passage 401′ is closed at the low speed timing valve 288 by the land *a* of spool 422 when the low speed timing valve 288 is in the position shown. Thus, when the transmission control requires the downshift from third to intermediate gear ratio, the fluid in servo release chamber 376 must be exhausted through the restriction 403 thus delaying the application of brake band 74. This will occur during coasting or low throttle downshifts when the modulator pressure in modulator passage 271 is low. However, during high engine torque requirements when modulator pressure is high, the valve spool 422 will be moved to the left to provide free flow from passage 401′ to passage 401 between lands *a* and *b* of valve spool 422.

Governor pressure in passage 289 is connected to the left end of valve spool 424 between land *b* and the plug 428. With the valve spool 424 in the position shown, drive passage 296 is freely connected through the servo apply passage 369 between lands *a* and *b* of the valve spool 424. Thus, main pressure in drive passage 296 is freely admitted to the servo apply chamber 371 during low speed operation. As governor pressure increases proportional to vehicle speed, the valve spool 424 will be moved to the right against spring 426. Thus, at higher vehicle speeds the land *b* of valve spool 424 closes drive passage 296 so that fluid directed to the servo apply passage 369 must pass through restriction 370 thus controlling the servo apply rate. Thus, at low throttle low speed operation, such as coasting, and during high speed operation, the application of brake band 74 is delayed. However, there is an intermediate range at medium speeds and medium to full throttle settings where the high speed timing valve is not shifted while the low speed timing valve is shifted so that both the servo apply passage 369 and the servo release passage 401′ are both open to free flow through the high speed timing valve 307 and the low speed timing valve 288 respectively. Thus, the brake band 74 will be applied rapidly in this intermediate range.

When the vehicle is initially started, there may be some air trapped in the pump inlet passage 262 which must be expelled before the control system can be fully pressurized. The priming valve 311 provides this function. The priming valve consists of a poppet valve 431 slidably mounted in a valve bore 432 and urged to the left by a spring 433 against the seat 434. The poppet valve 431 has a restriction 435 which connects main line 251 at the left side of the poppet to the reverse signal line 303 of the right side of the poppet valve 432. When the pump 20 is initially rotated, the air trapped in the inlet passage 262 is delivered via main passage 251 through restriction 435 to the reverse passage 303 which is exhausted at the manual valve 276. However, when hydraulic pressure begins to develop in passage 251, the poppet valve 432 is moved to the right against the spring 433 so that the restriction 435 is closed and no hydraulic fluid can escape to exhaust.

What is claimed is:

1. In combination a transmission including input means, output means, planetary gear means operatively connectable between said input and output means for providing a low speed ratio, a high speed ratio and a reverse speed ratio, a pair of friction means cooperating with said planetary gear means to establish the low, high and reverse speed ratios, one of said friction means being operable during the low, high and reverse speed ratios and the other being operable during the low speed ratio and inoperable during the high and reverse speed ratios; and control means including fluid passage means for conducting fluid, manual valve means in said fluid passage means for selecting low, drive and reverse signals, shift valve means in said fluid passage means operatively connected to said manual valve means and to said pair of friction means for providing automatic change from said low speed ratio to said high speed ratio, and manual control valve means in said fluid passage means operatively connected to said manual valve means, said shift valve means and said friction means for enforcing operation of said one friction means when said low or reverse signal is selected, for enforcing operation of said other friction means when said low signal is selected and for preventing operation of said other friction means during the high speed ratio when the drive signal is selected.

2. The invention defined in claim 1 and said planetary gear means including an input member, an input-reaction member, an output member drivingly connected to said output means, and a reaction member; said one friction means being a fluid operated low clutch selectively drivingly connectable between said input means and said input element; said other friction means being a fluid operated low brake selectively operatively connectable to said reaction member; and said transmission further including a fluid operated intermediate input clutch selectively drivingly connectable between said input means and said input-reaction member and a fluid operated reverse brake selectively operatively connectable to said input-reaction member; and said manual valve means being operative to provide operation of said reverse brake when said reverse signal is selected, and said shift valve means being operative to provide operation of said intermediate clutch during the high speed ratio when said drive signal is selected.

3. The invention defined in claim 1 and said fluid passage means including, a drive passage, a detent passage, a detent clutch apply passage, a low clutch apply passage, a servo release passage and exhaust means; and said manual control valve means including valve means movable to drive and low-reverse positions and including first fluid connection means to provide fluid communication between said low clutch passage and said servo release passage, in the drive position and between said servo release passage and said exhaust means in the low-reverse position, and second fluid connection means to provide fluid communication between said detent clutch apply passage and said exhaust means in the drive position and between said detent clutch apply passage and said detent passage in the low-reverse position; and said shift valve means including valve means movable to upshift and downshift positions to provide fluid communication between said detent apply passage and said low clutch apply passage in the downshift position and between said drive passage and said low clutch apply passage in the upshift position.

4. In combination a transmission including input means, output means, planetary gear means operatively connected between said input and output means for providing a low speed ratio, a high speed ratio and a reverse speed ratio, a pair of engageable and disengageable friction drive establishing means cooperating with said planetary gear means to selectively establish the low, high and reverse speed ratios, one of said friction drive establishing means being operable during the low, high and reverse speed ratios and the other being operable during the low speed ratio and inoperable during the high and reverse speed ratios; and control means including a variable pressure source, fluid passage means operatively connected to said variable pressure source for conducting fluid, detent pressure control means in said fluid passage means for providing a substantially constant detent pressure, manual valve means in said fluid passage means operatively connected to said variable pressure source for selectively providing low, drive and reverse signals, shift valve means in said fluid passage means movable to downshift and upshift positions for directing the drive signal to engage said one friction drive establishing means in the upshift position, and manual control valve means in said fluid passage means biased to a first position for directing said drive signal to disengage said other friction drive establishing means when said shift valve means is upshifted and movable to a second position in response to said low or reverse signal for directing said detent pressure to engage said one friction drive establishing means when said shift valve means is downshifted.

References Cited

UNITED STATES PATENTS

| | | | |
|---|---|---|---|
| 3,301,991 | 3/1967 | Leonard | 74—869 X |
| 3,327,554 | 6/1967 | Searles | 74—869 |
| 3,393,585 | 7/1968 | Pierce | 74—869 X |

ARTHUR T. McKEON, Primary Examiner

U.S. Cl. X.R.

74—759

PO-1050
(5/69)

UNITED STATES PATENT OFFICE
CERTIFICATE OF CORRECTION

Patent No. 3,509,784　　　　　　　　Dated　May 5, 1970

Inventor(s)　　　John E. Mahoney

It is certified that error appears in the above-identified patent and that said Letters Patent are hereby corrected as shown below:

Column 3, line 25, delete "42" and insert -- 32 -- ;

Column 6, line 45, delete "downshift bias to provide a" ;

Column 10, line 19, delete "aaginst" and insert -- against -- ;

Column 12, under References Cited delete "3,301,991" and insert -- 3,310,991 -- .

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents